United States Patent
Palmade

(10) Patent No.: US 7,163,154 B2
(45) Date of Patent: Jan. 16, 2007

(54) CONTACT LESS IC CARD WITH OPERATING SYSTEM USED IN CONTACT TYPE CARDS AND READER FOR SUCH CONTACTLESS CARDS

(75) Inventor: Romain Palmade, Auriol (FR)

(73) Assignee: STMicroelectronics S.A., Montrouge (FR)

( * ) Notice: Subject to any disclaimer, the term of this patent is extended or adjusted under 35 U.S.C. 154(b) by 43 days.

(21) Appl. No.: 10/471,883

(22) PCT Filed: Feb. 14, 2002

(86) PCT No.: PCT/FR02/00573

§ 371 (c)(1),
(2), (4) Date: Mar. 13, 2004

(87) PCT Pub. No.: WO02/073522

PCT Pub. Date: Sep. 19, 2002

(65) Prior Publication Data

US 2004/0146066 A1    Jul. 29, 2004

(51) Int. Cl.
*G06K 19/06*    (2006.01)

(52) U.S. Cl. ............ 235/492; 235/380; 235/441; 235/487

(58) Field of Classification Search ............ 235/492, 235/441, 380, 487
See application file for complete search history.

(56) References Cited

U.S. PATENT DOCUMENTS

| | | | | |
|---|---|---|---|---|
| 5,206,495 A | * | 4/1993 | Kreft | 235/492 |
| 5,594,233 A | * | 1/1997 | Kenneth et al. | 235/492 |
| 5,598,032 A | * | 1/1997 | Fidalgo | 257/679 |
| 6,045,043 A | * | 4/2000 | Bashan et al. | 235/441 |
| 6,105,874 A | * | 8/2000 | Berger et al. | 235/492 |
| 6,138,918 A | * | 10/2000 | Tarbouriech | 235/492 |
| 6,375,082 B1 | * | 4/2002 | Kobayashi et al. | 235/492 |
| 6,836,850 B1 | * | 12/2004 | Cheng | 713/324 |

OTHER PUBLICATIONS

"Contactless integrated circuit cards—Proximity cards—Transmission Protocol" Sep. 14, 2000, published by Afnor.*
Ranki, W., et al. "Handbuch der Chipkartan," 3, völlig überarb. und erw. Aufl., Mün chen, Wien, Hanser, 1999, http://www.hanser.de, ISBN 3-446-21115-2.
"Information technology—Identification cards—Integrated circuit(s) cards with contacts, Part 4: Interindustry commands for interchange," International Standard, ISO/IEC 7816-4, First edition 1995(E), pp. 1-46.
"Information technology—Identification cards—Integrated circuit(s) cards with contacts, Part 3: Electronic signals and transmission protocols," International Standard, ISO/IEC 7816-3, Second edition 1997(E), pp. 1-27.
"Identification cards—Contactless Integrated circuit(s) cards—Proximity cards, Part 4: Transmission protocol," Draft ISO/IEC FCD 14443-4, Mar. 10, 2000, pp. 1-33.

* cited by examiner

*Primary Examiner*—Steven S. Paik
*Assistant Examiner*—Daniel A. Hess
(74) *Attorney, Agent, or Firm*—Lisa K. Jorgenson; Jose Gutman; Fleit, Kain, Gibbons, Gutman, Bongini & Bianco P.L.

(57) ABSTRACT

A contactless electronic IC card (10), includes a communication device (14) for communicating with a contactless electronic IC card reader (12) in accordance with the ISO 14443-4 standard, a contact type electronic IC card operating system (16) communicating by APDU command and APDU response in accordance with the ISO 7816-4 standard, and a protocol conversion interface (18) between the communication device (14) and the operating system (16).

10 Claims, 2 Drawing Sheets

CONTACT LESS IC CARD WITH OPERATING SYSTEM USED IN CONTACT TYPE CARDS AND READER FOR SUCH CONTACTLESS CARDS

CROSS-REFERENCE TO RELATED APPLICATIONS

This application is the National Stage of International Application No. PCT/FR02/00573 filed on Feb. 14, 2002, which is based upon and claims priority from prior French Patent Application No. 0103401 filed Mar. 13, 2001, the entire disclosure of which is herein incorporated by reference.

BACKGROUND OF THE INVENTION

1. Field of the Invention

The invention relates to a new type of electronic IC (integrated circuit) card (also known as a smart card or chip card) of the contactless type, but which operates in accordance with an operating system for a contact type card. It also relates to reader for such contactless IC cards.

2. Description of Related Art

There exist two categories of electronic IC cards, distinguished according to whether or not they have electrical contacts for their link with a card reader.

Contact type electronic IC cards, presently the most widely used, operate in accordance with card operating systems and communicate with the reader in accordance with communication protocols, these systems and protocols being standardized. In particular, they communicate with the card reader in accordance with the ISO 7816-4 standard.

Contactless electronic IC cards, which are less widely used than the former, communicate with the card reader in accordance with the ISO 14443-4 standard, which is different from the ISO 7816-4 standard in many respects.

As a result, the user of contactless electronic IC cards must develop a specific operating system adapted to the ISO 14443-4 standard to produce the same functional features as those of the contact type IC card.

Conversely, the user of contact type electronic IC cards cannot implement the operating system of a contactless card without modifying the latter to take into account the specific aspects of the ISO 14443-4 standard.

SUMMARY OF THE INVENTION

An aim of the present invention is thus to produce a contactless electronic IC card which implements the operating system of a contact type card, but which communicates with a contactless card reader in accordance with a classic communication protocol.

This aim is achieved by producing a contactless electronic IC card, characterized in that it comprises:
 a communication device for communicating with a contactless electronic IC card reader in accordance with the ISO 14443-4 standard,
 a contact type electronic IC card operating system communicating by APDU command and APDU response in accordance with the ISO 7816-4 standard, and
 a protocol conversion interface between the communication device and the operating system.

APDU is an acronym for "Application Protocol Data Unit".

The protocol conversion interface is preferably in software form, the control being exercised by the communication device or the operating system.

The invention also relates to a reader for contactless electronic IC cards such as defined above, characterized in that it comprises:
 a reader communication device for communicating, as reader, with a plurality of contactless IC cards and working in accordance with the ISO 14443-4 standard,
 a reader operating system for contact type electronic IC card operation as reader, and
 a protocol conversion interface between the reader communication device and the reader operating system to establish a communication in accordance with the ISO 7816-4 standard.

The protocol conversion interface of the reader is preferably in software form under the control of either the reader communication device or the reader operating system.

This reader operating system comprises means for processing several above-defined electronic IC cards.

BRIEF DESCRIPTION OF THE DRAWINGS

Other characteristics and advantages of the present invention shall become apparent from reading the following description of a preferred embodiment, the description being made in conjunction with the appended drawings in which.

DETAILED DESCRIPTION OF PREFERRED EMBODIMENTS

Figure 1:
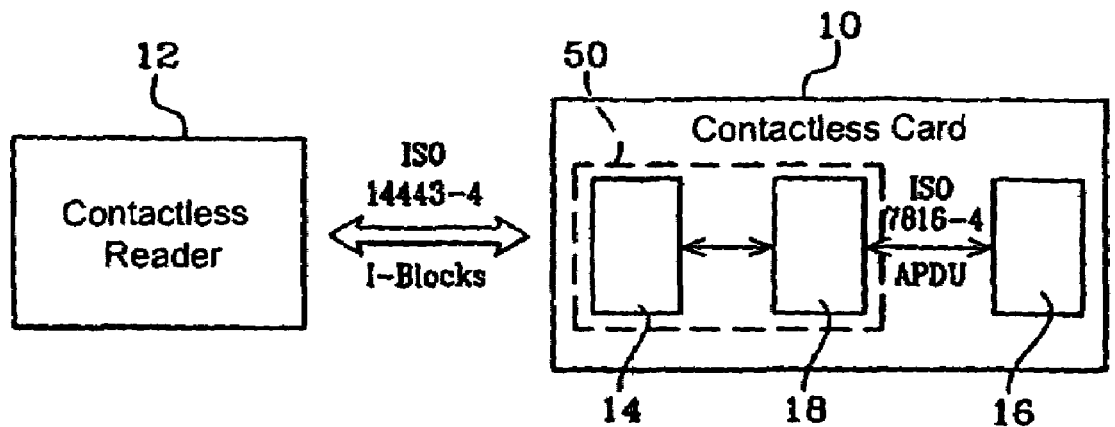
FIG. 1 is a block diagram of a contactless card according to the invention and its communication link with a contactless card reader.

A contactless electronic IC card 10 in accordance with the invention comprises, functionally and schematically:
 a communication device 14 for communicating with a contactless electronic IC card reader 12,
 a contact type electronic IC card operating system 16, and
 a protocol conversion interface 18 for protocol conversion between the communication device 14 and the operating system 16.

The bidirectional communication between a contactless electronic IC card reader 12 and the communication device 14 is carried out in accordance with the ISO 14443-4 standard.

The bidirectional communication between the communication device 14 and the protocol conversion interface is preferably carried out in software form under the control of the communication device 14. This operation is symbolized by the rectangle in broken lines 50.

The bidirectional communication between the protocol conversion interface 18 and the operating system 16 is carried out in accordance with the ISO 7816-4 standard.

The details of these bidirectional communications shall be described with reference to FIGS. 3 to 6.

In the ISO 7816-4 standard, the APDU commands are defined according to the following message format 20 (FIG. 3):
- a CLA zone indicating the class of the command,
- an INS zone defining the instruction,
- two zones P1 and P2 indicating the instruction parameters,
- three zones Lc1, Lc2 and Lc3 indicating the length of the data contained in a following DATA zone,
- a DATA zone containing the data, and
- two zones Le1 and Le2 containing the number of bytes to read if dealing with a read command.

The length of the message is practically not limited in an APDU command since its maximum size is of 16 777 225 bytes.

Figure 4:
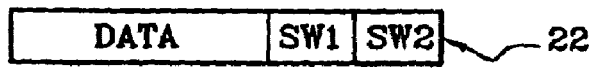
FIG. 4 shows the format of an APDU response message in accordance with the ISO 7816-4 standard.

In response to this APDU command, the operating system 16 responds with an APDU message or response 22 in accordance with the format of FIG. 4.

This APDU response 22 comprises:
- a DATA zone containing the data, and
- two zones SW1 and SW2 which contain state bytes.

In the ISO 14443-4 standard, the so-termed I-Block commands are defined in accordance with the following message format 24 (FIG. 5):
- a PCB zone which indicates the nature of the "Block", given that there exist, in addition to the I-Blocks for information, R-Blocks for message acknowledgement of receipt and S-Blocks for delay indications,
- a CID zone which indicates the number of the card to process,
- a NAD zone which indicates the application number,
- an INF zone for the data, and
- a zone EDC1 and EDC2 for a transmission error detection in respect of binary digits of the message.

The length of the I-Block message is 256 bytes, but if the length of the INF part leads to a message of more than 256 bytes, the excess is sent by the following message(s).

Figure 5:
FIG. 5 shows the format of an I-Block command message in accordance with the ISO 14443-4 standard.

In accordance with the invention, the contactless electronic IC card reader sends an APDU command by inserting it in the INF part of the I-Block command message 24 (FIG. 5). If the available length in the INF part is not sufficient, the APDU command is sent in several successive messages.

Figure 6A:
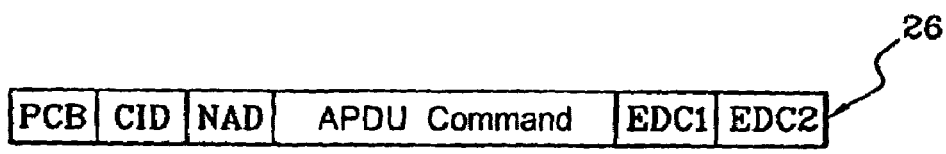
FIGS. 6a, 6b, 6c and 6d show the messages at different stages of communication.
Figure 6B:
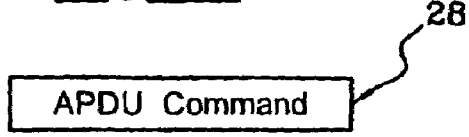
Figure 6C:
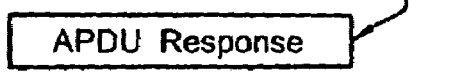
Figure 6D:
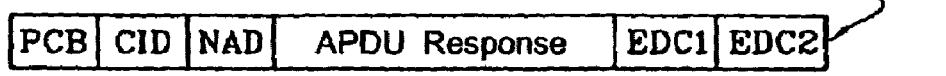

There is then obtained the message 26 of FIG. 6a.

The communication device 14 of the electronic IC card receives this message and analyzes it in accordance with the ISO 14443-4 standard to isolate the INF part.

The protocol conversion interface 18 transfers the APDU command 28 (FIG. 6b) to the operating system 16 in accordance with the ISO 7816-4 standard.

The operating system 16 processes this APDU command and responds to it by an APDU response 30 (FIG. 6c) which is sent to the protocol conversion interface 18 in accordance with the ISO 7816-4 standard.

The interface 18 transforms this APDU response into an I-Block command 32 in accordance with the ISO 14443-4 standard and passes it to the communication device 14 for sending to the reader 12 in accordance with the ISO 14443-4 standard.

The contactless electronic IC card reader 12 sends APDU commands and receives APDU responses in accordance with the ISO 14443-4 standard.

Also, to prepare these APDU commands and analyze the APDU responses, the reader 12 must have a reader operating system of the type for a contact type electronic IC card which communicates in accordance with the ISO 7816-4 standard.

Figure 2:
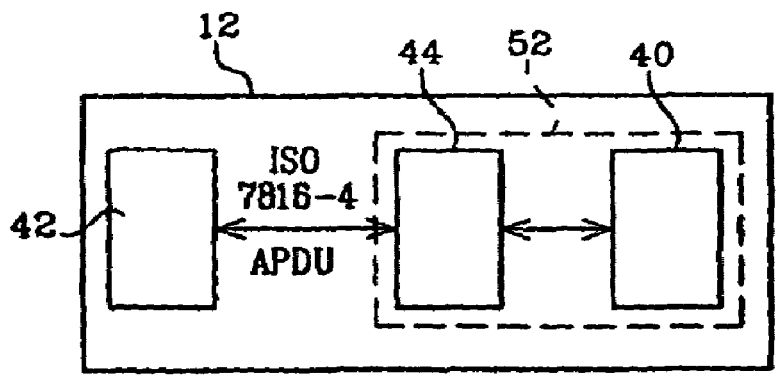
FIG. 2 is a block diagram of a contactless electronic IC card reader implemented with cards according to the invention.
Figure 3:
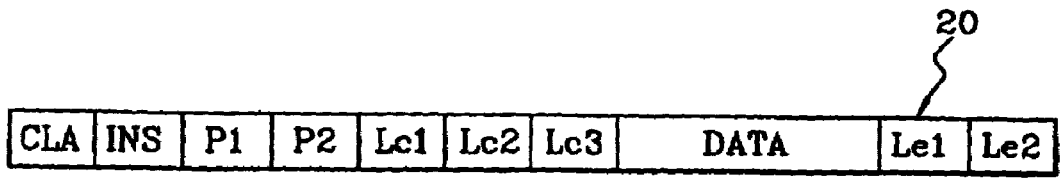
FIG. 3 shows the format of an APDU command message in accordance with the ISO 7816-4 standard.

Accordingly, the reader 12 must have a functional structure analogous to that of the electronic IC card 10, i.e. comprising (FIG. 2):
- a reader communication device 40 for communicating as a reader with a plurality of contactless electronic IC cards operating in accordance with the ISO 14443-4 standard,
- a reader operating system 42 of the type for contact type electronic IC cards, and
- a protocol conversion interface 44 for conversion between the reader communication device 40 and the reader operating system 42 to establish a communication in accordance with the ISO 7816-4 standard.

The reader communication device 40 is of the classic type, allowing it to communicate with several contactless cards. The protocol conversion interface 44 is analogous to that 18 of the IC card 10 and is preferably in software form under the control of the communication device 40; its operation is symbolized by the rectangle in broken lines 52.

The operating system 42 is of the type for a contact type electronic IC card, but is adapted to process several contactless electronic IC cards simultaneously.

The electronic IC card in accordance with the invention has been described with a protocol conversion interface 18 under control of the communication device 14; however, the invention can also be implemented with a protocol conversion interface 18 under control of the operating system 16.

Likewise, the contactless electronic IC card reader has been described with a protocol conversion interface 44 under the control of the contactless communication device 40; however, this control can also be exercised by the reader operating system 42.

By virtue of the invention as described above, it is possible to produce a contactless IC card using the operating system of a contact type IC card associated to a contactless card type communication device and by carrying out a conversion or transposition of protocol between the operating system and the communication device. This avoids having to produce a new operating system adapted to the communication standard for contactless cards.

In a similar way, the remote reader of these new contactless IC cards uses an operating system for cards with contacts combined with a device for communication with contactless cards, a conversion or transposition interface being provided between the operating system and the communication device of the reader. Moreover, the operating system for contact type cards must comprise means for processing all electronic IC cards in accordance with the invention which are in communication with the communication device 40 of the reader.

What is claimed is:

1. A contactless electronic IC card, comprising:
   - a communication device for communicating with a contactless electronic IC card reader in accordance with the ISO 14443-4 standard;
   - a contact type electronic IC card operating system communicating by APDU (Application Protocol Data Unit) command and response in accordance with the ISO 7816-4 standard; and
   - a protocol conversion interface between the communication device and the operating system, the protocol conversion being made on octets forming the protocol so that the communication device can send APDU responses and receive APDU commands in accordance with the ISO 14443-4 standard wherein the APDU command and the APDU response in accordance with the ISO 7814-4 standard are sent between the communication device and the contactless electronic IC card reader in accordance with an I-Block command format of the ISO 14443-4 standard, the APDU command or APDU response constituting a data zone (INF) of the I-Block command.

2. The contactless electronic IC card according to claim 1, wherein the protocol conversion interface is in software form under the control of the communication device.

3. The contactless electronic IC card according to claim 1, wherein the protocol conversion interface is in software form under control of the operating system.

4. The contactless electronic IC card according to claim 1, wherein the protocol conversion interface sends the APDU command to the operating system and sends the APDU response from the operating system to the communication device.

5. The contactless electronic IC card according to claim 4, wherein the protocol conversion interface is in software form under the control of the communication device.

6. The contactless electronic IC card according to claim 4, wherein the protocol conversion interface is in software form under control of the operating system.

7. A reader for a contactless electronic IC card, comprising:
a reader communication device for communicating, as a reader, with a plurality of contactless IC cards working in accordance with the ISO 14443-4 standard;
a reader operating system for contact type electronic IC card operation as reader; and
a protocol conversion interface between the reader communication device and the reader operating system to establish a communication in accordance with the ISO 7816-4 standard, wherein APDU command and response messages in accordance with the ISO 7816-4 standard are transmitted between the reader communication device and the contactless electronic IC card in an I-Block command format of the ISO 14443-4 standard, the APDU command or APDU response message constituting a data zone (INF) of the I-Block command.

8. The reader according to claim 7, wherein the protocol conversion interface is in software form under the control of the reader communication device.

9. The reader according to claim 7, wherein the protocol conversion interface is in software form under the control of the reader operating system.

10. The reader according to claim 7, wherein the operating system comprises means for processing several electronic IC cards in communication with the reader communication device.

* * * * *